INVENTOR.
Terence M. Nolan.
BY Harness, Dickey & Pierce
ATTORNEYS.

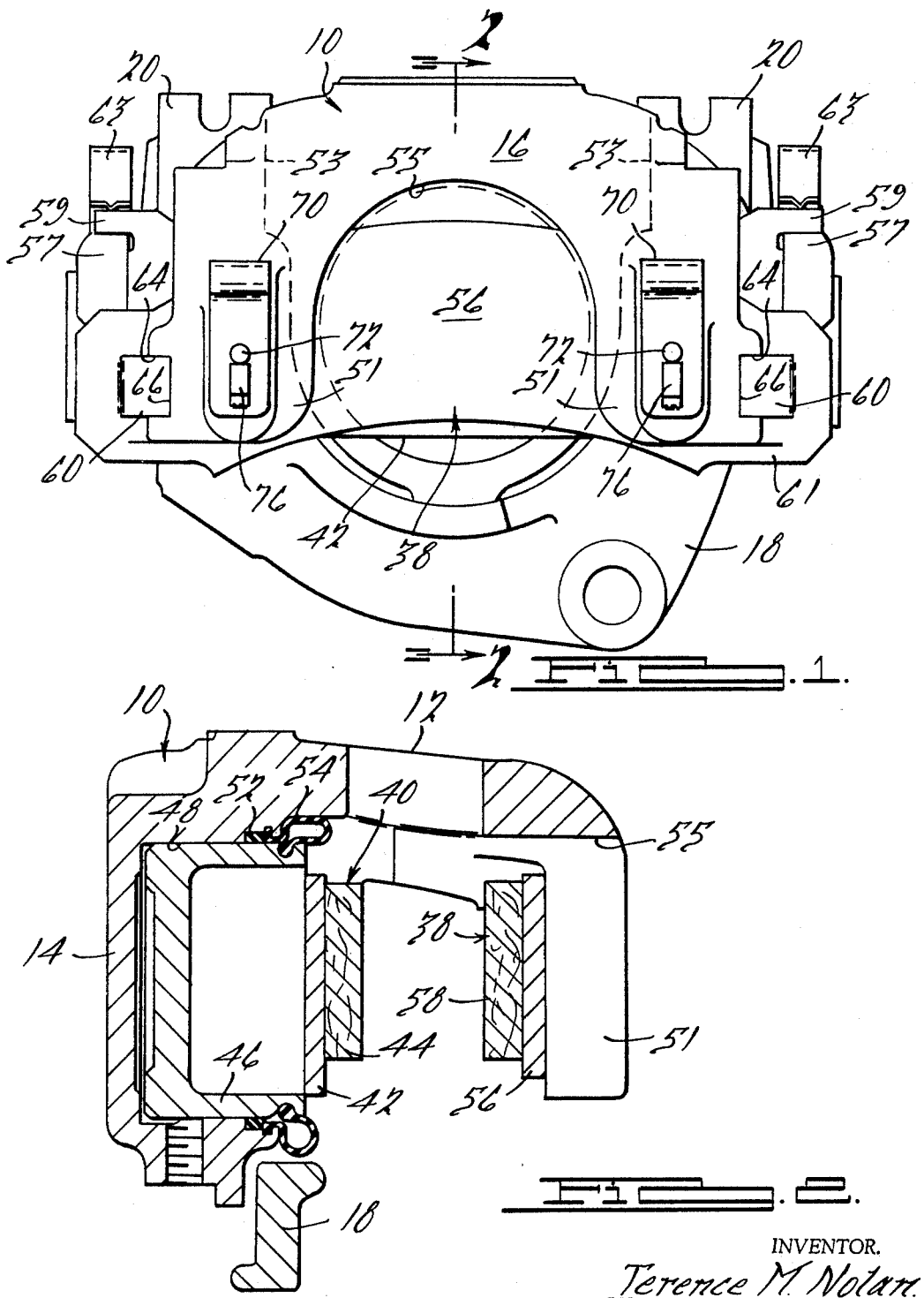

United States Patent Office 3,500,967
Patented Mar. 17, 1970

---

3,500,967
DISC BRAKE SHOE RETENTION MEANS
Terence M. Nolan, Bloomfield Hills, Mich., assignor to Kelsey-Hayes Company, Romulus, Mich., a corporation of Delaware
Filed July 1, 1968, Ser. No. 741,624
Int. Cl. F16d 55/224, 65/02
U.S. Cl. 188—73                                  5 Claims

ABSTRACT OF THE DISCLOSURE

A sliding caliper type disc brake assembly for motor vehicles, wherein one brake shoe is slidably suspended relative to the caliper for direct piston actuation. The caliper has a reaction portion on its side opposite from the piston to which a second brake shoe is secured. A backing plate of the second brake shoe is formed with abutment portions designed to engage shoulders on the reaction portion. Spring biased pins extend through the reaction portion and the second brake shoe to hold the second brake shoe on the reaction portion.

BACKGROUND OF THE INVENTION

The disk brakes to which the present invention is applicable include those having a disk or rotor secured for rotation with the vehicle wheel and a caliper or housing embracing a portion of the rotor. A pair of brake shoes are nonrotatably supported on opposite sides of the rotor and are movable into frictional engagement with opposite parallel faces thereof. The caliper has generally opposed portions lying on opposite sides of the rotor. A piston is carried by one portion of the caliper to press one brake shoe directly against one face of the rotor. The caliper is movable in a generally axial direction so that the reaction force to piston energization biases the caliper in a direction causing the other portion of the caliper to press the other brake shoe against the opposite face of the rotor.

Construction, assembly and maintenance costs for high production devices such as disk brakes always play a vital role in their commercial acceptability. It is, therefore, important that a disk brake embodying the features necessary to accomplish the above operating characteristics be capable of relatively inexpensive manufacture, possess superior strength and reliability, and be susceptible of easy and inexpensive assembly, disassembly and service. Also, the disk brake assembly as a whole should be such as to afford smooth vibration and rattle-free performance throughout its useful life.

SUMMARY OF THE INVENTION

This invention relates generally to brakes and, more particularly, to a sliding caliper type disk brake assembly and a shoe therefor wherein said shoe is held on the caliper and transmits its torque to the caliper in a novel manner.

The disk brake of the present invention contemplates the use of a caliper in which recessed torque taking shoulders are formed on the outer sides of the caliper reaction portion, a location which is relatively easily machined. This construction permits the use of a brake shoe having abutments die formed on its backing plate and disposed at such an angle to applied braking forces as to minimize the possibility of deforming the backing plate. These abutments are fitted in recesses of the caliper which help to support the reaction shoe. The reaction shoe is held in place on the caliper reaction portion by spring loaded pins which are extremely reliable, prevent shoe rattle and are easily removed. These objectives are more easily achieved by virtue of the fact that the pins perform no torque taking function. The entire construction is relatively inexpensive and possesses a high degree of strength, reliability and structural simplicity.

BRIEF DESCRIPTION OF THE DRAWINGS

FIGURE 1 is an elevational view of a disk brake assembly of the present invention;

FIGURE 2 is a sectional view of the structure shown in FIGURE 1 taken substantially along the line 2—2 thereof;

DETAILED DESCRIPTION OF THE PREFERRED EMBODIMENT

Figure 3:
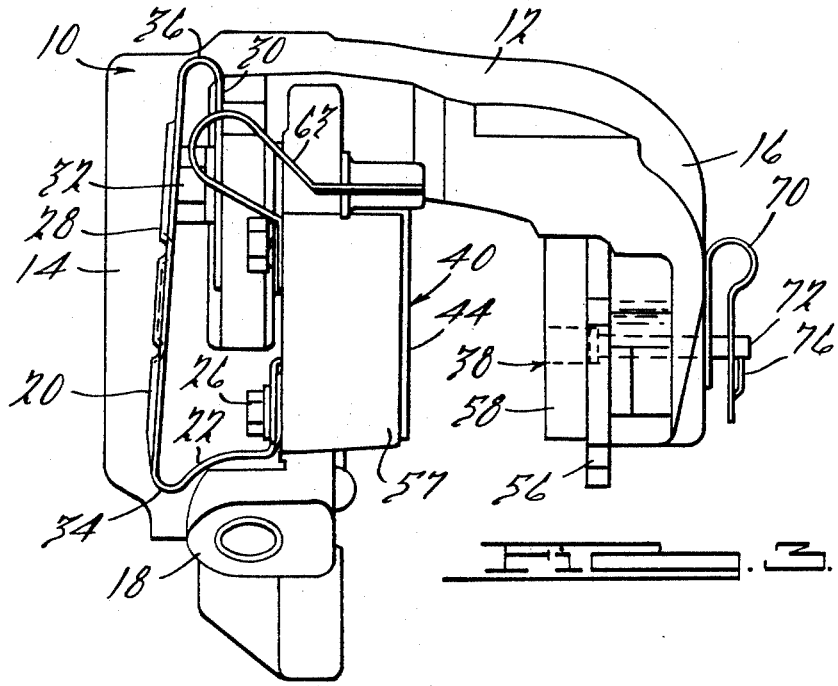
FIGURE 3 is an end elevational view of the structure shown in FIGURE 1.
Figure 4:
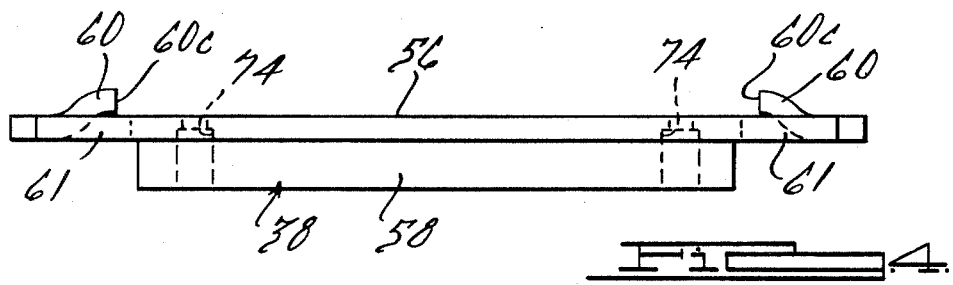
FIGURE 4 is a plan view of a brake shoe forming a part of the structure of FIGURES 1–3.
Figure 5:
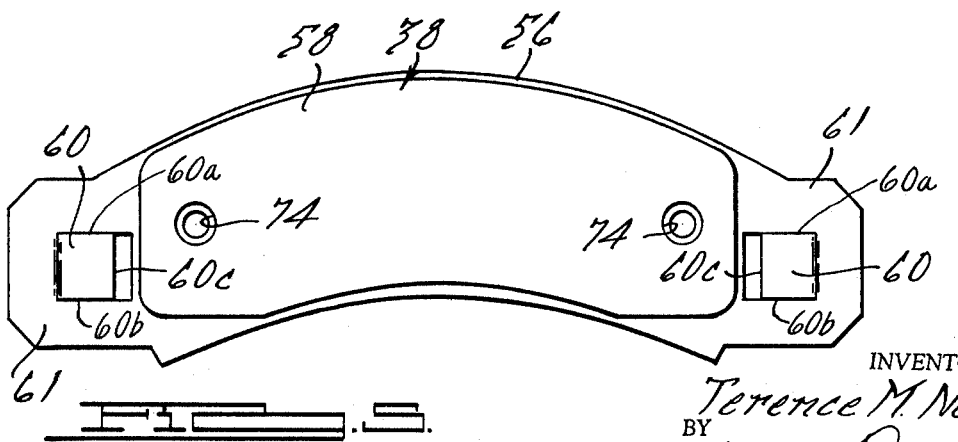
FIGURE 5 is a front elevational view of the brake shoe of FIGURE 4.

Broadly described, the brake of the present invention includes a caliper housing having portions disposed on opposite sides of an arcuate portion of a rotor secured for rotation with the wheel, fluid motor means associated with one housing portion and adapted to press a first brake shoe into frictional engagement with one face of said rotor, a second brake shoe carried by the other housing portion and adapted to engage the other face of said rotor, opposed slots or recesses in said other housing portion, abutments on said second brake shoe fitted in said caliper recesses to prevent relative circumferential and radial movement between said caliper and second brake shoe, a pair of headed pins which extend through said second brake shoe and spring clips engageable between said pins and said caliper for holding said second brake shoe with its abutments in said recesses.

Referring now more specifically to the drawings, a disk brake embodying the present invention will be seen to include a housing or caliper 10, having opposed fluid motor and reaction portions 14 and 16, respectively, joined by a bridge portion 12. The housing 10 embraces a segment of the rotor or disk (not shown) with the portions 14 and 16 in spaced confronting relation to the opposite sides thereof. The caliper 10 is supported on a fixed support member in the form of a torque plate 18 which is designed to be secured to a steering knuckle (not shown) or other non-rotating structure adjacent the rotor.

As best seen in FIGURE 3, the caliper 10 is fitted with a pair of flexible straps 20, each having an inner flange 22 secured to the torque plate 18 by screws 26. Each strap 20 has a main portion 28 extending generally radially outwardly from the flange 22 to a flange 30 which is attached by threaded pins 32 to the caliper portion 14. The portions of the straps 20 between the main portions 28 thereof and the flanges 22 and 30 are bent to define hinges 34 and 36. The hinges 34 and 36 flex to accommodate movement of the caliper 10 in an axial direction.

A pair of brake shoes 38, 40 are disposed in confronting relation to opposite radial forces of the rotor (not shown). The brake shoe 40 includes a backing plate 42 having brake lining 44 fixed thereto by bonding or rivets as is well known in the art. The backing plate 42 is positioned for engagement by a piston 46 slidably disposed within a cylinder bore 48 formed in the caliper fluid motor portion 14.

The cylinder bore 48 and piston 46 together form a fluid motor to which pressurized fluid is delivered from a conventional master cylinder (not shown). A flexible dust boot 54 has its ends fixed to the caliper 10 and the piston 46 respectively, to prevent contamination of the sliding piston 46 and cylinder surfaces 48.

When fluid pressure is delivered to the cylinder bore 48 from the master cylinder (not shown), the piston 46 s moved to the right as shown in FIGURE 2, and presses the lining 44 of the brake shoe 40 into frictional engagement with the face of the rotor. This causes an annular, generally rectangular cross-sectional seal 52, carried in the cylinder bore 48 and engaging the piston 46, to twist or distort. When the fluid pressure is released, the seal 52 will move the piston 46 to the left slightly and release the brake shoe 40 from the rotor. Axial movement of the caliper is guided by the pins 32, which are slidably fitted in grommeted openings in the torque plate 18. The threads of the pins 32 only engage the caliper 10.

The manner in which the reaction brake shoe 38 is fitted to the caliper reaction portion 16 and the configuration of the shoe 38 comprise the distinguishing features of the present invention.

When the lining 44 of the brake shoe 38 and a lining 58 of the shoe 40 engage the rotor face during wheel rotation, the friction exerts a torque on the shoes which is reacted at the torque plate 18. The ends of the shoe 40 abut flanges 57 formed on the torque plate 18 for direct torque transfer from the shoe 40 to the plate 18. Ears 59 of the backing plate 56 rest on the flanges 57 and are held down by spring clips 63. The shoe 38 transmits its torque through the caliper reaction portion 16. The torque transmitted to the caliper 10 is reacted against shoulders 53 (FIGURE 1) formed on the torque plate 18.

The caliper reaction portion 16 is formed with a rather large central recess 55 of generally arcuate shape. The recess 55 bifurcates the reaction portion 16 into two legs 51 which are circumferentially spaced. The shoe 38 engages the legs 51 and spans the recess 55 therebetween.

According to the present invention the brake shoe 38 consists of a generally planar sheet metal backing plate 56 to which a frictional lining 58 is affixed in any known manner. The backing plate 56 extends circumferentially beyond the legs 51 at its opposite ends 61. The backing plate ends 61 are sheared and indented to form struck-up abutments 60. The abutments 60 are of generally rectangular shape, having sheared upper, lower, and end edges 60a, 60b, and 60c, on three of its four sides. The fourth side merges into the main planar portion of the backing plate 56. It will be seen that the abutments extend toward one another and away from the opposite ends of the backing plate 56 to which they are adjacent. The end edges 60c are raised from the backing plate 56 a distance substantially equal to the thickness of the metal of the backing plate.

The outer sides of the reaction portion legs 51 have recesses 64 machined therein to conformably receive the abutments 60. The recesses 64 each have an inner wall forming a shoulder 66 which is engaged by the abutment edges 60c. The spacing between the two edges 60c is the same as the spacing between the two shoulders 66 to hold the shoe 40 against circumferential movement in either direction. The backing plate 56 is held axially to the legs 51 by headed pins 72 which extend through the backing plate 56 and the legs 51. The head of each pin 72 fits in a counterbored aperture 74 of the plate 56 while the end of each pin 72 opposite its head is gripped by a clip 70 which seats against a leg 51 and biases the pin 72 in a right hand direction as viewed in FIGURE 3. Each clip 70 has a tang 76 that bites into its associated pin 72. The spring clips 70 thus apply an axial force to the shoe 38 to hold it against the caliper portion 16 with its abutments 60 seated in the outwardly facing recesses 64. The recesses 64 confine the abutments 60 to prevent all non-axial movement of the shoe 38.

The shoe 38 is easily disassembled from the caliper 10 by inserting a tool under the tangs 76 to free the clips 70 from the pins 72. The shoe can then be moved axially toward the rotor until the abutments 60 clear the recesses 64. Should a clip 70 accidentally come off in use, however, the rotor would normally prevent the shoe 38 from moving sufficiently axially inwardly to permit the shoe abutments 60 from coming out of their recesses 64.

By the foregoing, there has been disclosed an improved disk brake and shoe for use therewith and while a preferred embodiment of the invention has been illustrated and described above in detail, various additions, substitutions, modifications and omissions may be made thereto.

What is claimed is:

1. In a disk brake assembly having a stationary axle part, a rotatable disk, a caliper member straddling at least a portion of the periphery of said disk, first and second brake shoes, said caliper member having fluid motor means on one side thereof operable to actuate said first brake shoe and a reaction portion on the opposite side thereof operable to actuate said second brake shoe, means supporting said caliper member for axial movement but preventing circumferential movement thereof, the improvement which comprises means defining a pair of spaced shoulders on said caliper member reaction portion, said second brake shoe comprising a frictional lining and a sheet backing plate, said backing plate being formed with integral offset flanges extending in a direction substantially parallel to the main portion of said backing plate, said flanges forming at their outer extremities abutment surfaces extending substantially perpendicularly to the main portion of said backing plate, said abutment surfaces being formed by the thickness of the sheet material of said backing plate and being engaged with said shoulders of said caliper member for holding said second brake shoe against rotation relative to said caliper member.

2. A disk brake assembly as set forth in claim 1 further including means for holding the second brake shoe axially against the caliper member reactive portion.

3. A disk brake assembly as set forth in claim 1 wherein the flanges are sheared from the backing plate on three sides and are joined to the main portion on the fourth side, the side opposite to said fourth side forming the abutment surface.

4. A disk brake assembly as set forth in claim 1 wherein the means defining the pair of spaced shoulders on the caliper member reactive portion includes means forming grooves on said reactive portion, said shoulders being formed at the bases of said grooves, the integral offset flanges of the backing plate extending into said grooves.

5. A disk brake assembly as set forth in claim 4 wherein the shoulders of the caliper reactive portion are oppositely facing and the abutment surfaces of the backing plate face each other.

References Cited

UNITED STATES PATENTS

| 3,166,156 | 1/1965 | Burnett et al. | 188—73 |
| 3,317,009 | 5/1967 | Warwick | 188—73 |
| 3,366,200 | 1/1968 | Hayes | 188—73 |
| 3,387,687 | 6/1968 | Eggstein et al. | 188—73 |

GEORGE E. A. HALVOSA, Primary Examiner

U.S. Cl. X.R.

188—250